United States Patent [19]

Fushihara

[11] 4,289,599
[45] Sep. 15, 1981

[54] APPARATUS FOR PRODUCING ALKALINE WATER AND ACIDIC WATER

[75] Inventor: Tomotsuru Fushihara, Tokyo, Japan

[73] Assignee: Kabushiki Kaisha Kogai Boshi Sogo Kenkyusho, Tokyo, Japan

[21] Appl. No.: 128,883

[22] Filed: Mar. 10, 1980

[30] Foreign Application Priority Data

Nov. 30, 1979 [JP] Japan .......................... 54-165629[U]

[51] Int. Cl.³ .......................... C25B 9/00; C25B 1/22; C02F 1/46
[52] U.S. Cl. .................................. 204/275; 204/103; 204/152; 204/271; 204/276
[58] Field of Search .............. 204/275, 149, 276, 152, 204/271, 278, 277, 237, 269, 103

[56] References Cited

U.S. PATENT DOCUMENTS

| | | | |
|---|---|---|---|
| 3,483,568 | 12/1969 | Andersen et al. | 204/237 X |
| 3,623,969 | 11/1971 | Hushihara | 204/271 |
| 4,039,422 | 8/1977 | Packer | 204/275 X |
| 4,049,531 | 9/1977 | Ban | 204/275 |
| 4,093,532 | 6/1978 | Branibar | 204/271 |
| 4,119,520 | 10/1978 | Paschakarnis et al. | 204/271 X |

Primary Examiner—Donald R. Valentine
Attorney, Agent, or Firm—Birch, Stewart, Kolasch & Birch

[57] ABSTRACT

An apparatus for producing alkaline water and acidic water which includes a container which houses an electrolytic cell, said electrolytic cell containing a lower chamber provided with a water inlet zone and a water outlet zone, and an upper chamber containing anode plates and cathode plates disposed in a spaced apart predetermined relationship, inlet means for introducing water into the water inlet zone of the lower chamber of said electrolytic cell, said inlet means including valve means, first and second outlet means disposed at the upper end portion of the upper chamber for removing alkaline water and acidic water respectively, therefrom, said first outlet means provided with means for discharge from the apparatus, and said second outlet means provided with means for communicating with the water outlet zone for discharge from the apparatus, and electrical means for providing the necessary electrical power to the apparatus.

11 Claims, 3 Drawing Figures

APPARATUS FOR PRODUCING ALKALINE WATER AND ACIDIC WATER

BACKGROUND AND SUMMARY OF THE INVENTION

The present invention relates to an apparatus for electrolyzing drinking water supplied to an ordinary household i.e. so-called city water, into alkaline water and acidic water. More particularly, the present invention is directed to an apparatus directly connected to a water tap for producing alkaline water and acidic water by instantaneously and continuously electrolyzing the water.

Heretofore, an apparatus of this kind described above was a batch type device which comprises an electrolytic cell divided by a diaphragm such as a porous porcelain cup, into an alkaline water chamber and an acidic water chamber. Cathode plates or rods were provided in the alkaline water chamber and anode plates or rods were provided in the acidic water chamber. When the chambers were filled with water and an electric current is applied to the respective electrodes, the water is electrolyzed to produce alkaline and acidic waters. Each chamber is connected to a faucet from which the produced water can be withdrawn.

In such a case, the electrolytic cell or a corresponding tank must be filled with water, and it is impossible to produce the alkaline and acidic waters continuously or in abundance. Also, the production is cumbersome.

Furthermore, with the above-mentioned batch system, the electrolyzed waters must be maintained separately and therefore it is necessary to use a diaphragm.

However, such a diaphragm is always moist, even when it is not in use and therefore it is likely to lead to the breeding of bacteria. Thus, there is the problem that the apparatus might be infested by bacteria.

In addition, fine particles or atoms, e.g., sodium, calcium, potassium, etc., contained in water tend to adhere to the diaphragm and close up its fine perforations, whereby the effectiveness for electrolysis gradually decreases. At the same time, due to the adhesion to the diaphragm of sodium, calcium, potassium, etc. which are useful for health, their presence in the electrolyzed water decreases and accordingly the effectiveness as the treated water decreases.

Accordingly, the primary object of the present invention is to overcome such drawbacks inherent to the conventional batch system treatment of water and to provide an apparatus which makes it possible to produce sufficient amounts of alkaline and acidic waters efficiently by a relatively simple operation.

Another object of the present invention is to provide a device which eliminates the use of a diaphragm which is likely to become infested by bacteria and to provide a sanitary apparatus which is capable of completely draining water from the electrolytic cell thereby preventing the breeding of bacteria.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

The present invention comprises an electrolytic cell containing anode and cathode plates spaced from one another at a predetermined distance and having, at its lower portion, a water inlet and a discharge outlet and, at its upper portion, outlets for alkaline water and acidic water. The electrolytic cell also includes a hose for continuously supplying water from a water tap to the electrolytic cell, and hoses connected, respectively, to the outlets of the alkaline water and the acidic water in the electrolytic cell, whereby city water is continuously supplied to the electrolytic cell and at the same time, alkaline and acidic waters are instantaneously and continuously produced by electrolysis.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
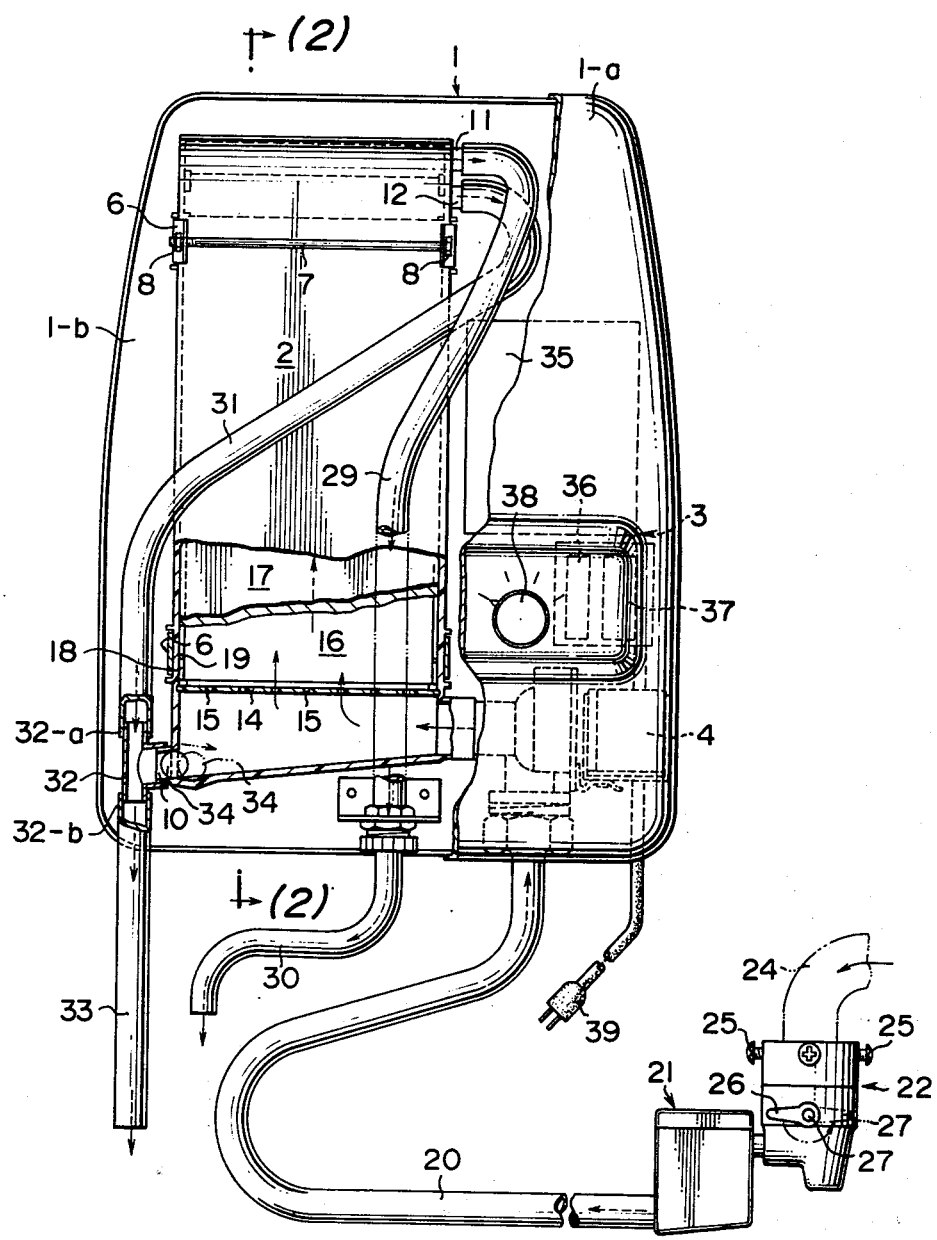
FIG. 1 is a front view of the apparatus of the present invention which is partially cut off.
Figure 2:
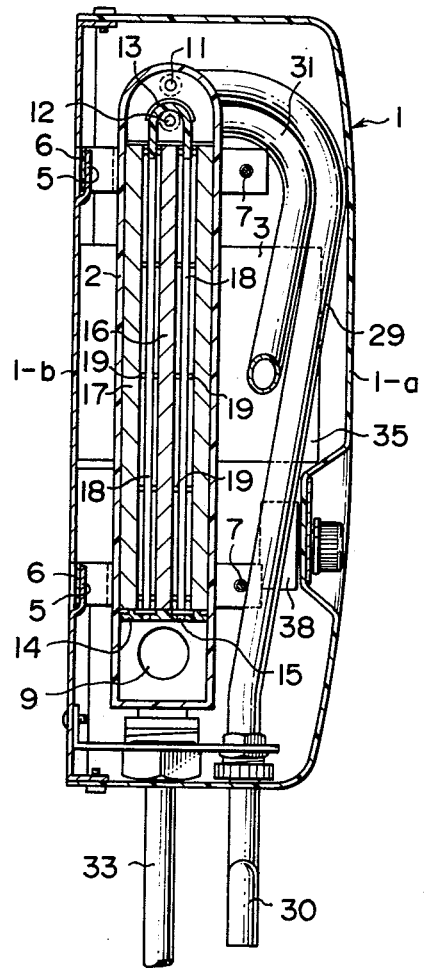
FIG. 2 is a cross-sectional view taken along line 2—2 of FIG. 1.
Figure 3:
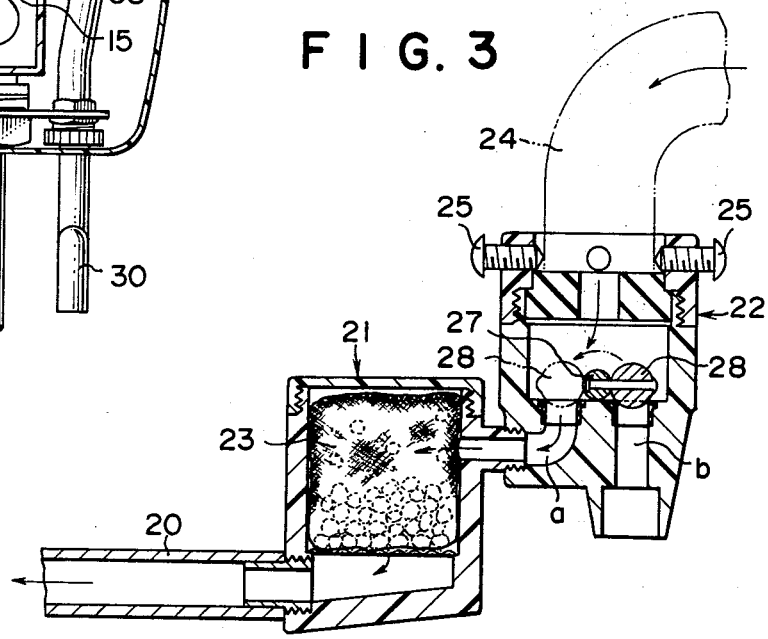
FIG. 3 is an enlarged cross-sectional view of the divergent valve portion of the apparatus of the present invention.

The present invention will now be described with reference to the drawings, wherein element 1 designates a case comprising a cover 1-a and a base plate 1-b having a hollow structure. Within the case 1, an electrolytic cell 2, an electric apparatus 3 and a quantitative valve 4 are accommodated.

The electrolytic cell 2 is mounted in the case in such a manner that the cell 2 is bound by upper and lower fixing bands 6 which are securely hung on hanger pieces 5 formed by inwardly stamped out upper and lower portions of the base plate 1-b and the bands 6 are secured by clamping bolts 7 and nuts 8 at both sides thereof.

The electrolytic cell 2 is made of a synthetic resin material having a hollow structure. At a lower part of one side thereof there is provided a water inlet 9 and at the other side thereof a water outlet 10, which is open. The bottom is inclined downwardly from the water inlet 9 towards the water outlet 10 so that water will not remain in the electrolytic cell 2.

On one side of the electrolytic cell 2 at the upper portion, there are provided an alkaline water outlet 11 and an acidic water outlet 12. The outlets 11 and 12 open into inner and outer chambers which are divided by divider wall 13 provided at an upper portion within the electrolytic cell 2.

Within the electrolytic cell 2 there is a divider plate 14 horizontally disposed above the water inlet 9. The divider plate is provided with a plurality of perforations through which water introduced within the electrolytic cell 2 is led to the upper chamber above the divider plate 14.

Within the chamber above the divider plate 14, there are provided an anode plate 15 and a cathode plate 17 at both the front and rear of the anode plate 16. These electrode plates are spaced from one another at a predetermined distance by a frame 18 having protrusions 19 so that water passing between the anode and cathode plates 16 and 17 is electrolyzed and then separated into the respective chambers divided by the above-mentioned divider wall 13.

In the illustrated embodiment, the frames 18 are integrally dependent from the divider wall 13. However, they may be provided independent of the divider wall.

A connecting hose 20 is attached to the water inlet 9 of the electrolytic cell 2 via a quantitative valve 4 which controls the incoming water so that a predetermined quantity of water is introduced regardless the pressure of the supplied water. A divergent valve 22 is attached to the front end of the hose 20 via a filter cylinder 21. The quantitative valve 4 comprises a solenoid and a valve plate.

The filter cylinder 21 is packed with calcium lactate, or active carbon or a similar deodorant agent 23. When calcium lactate is utilized, an active calcium ion water is obtained which is used for pharmaceutical purposes, for instance, as a gargling water utilizing its germicidal properties.

The divergent valve 22 is a known type of valve comprising a path (a) for supplying water to the electrolytic cell 2 and a path (b) for letting water flow through, said paths being selectively closable. The valve is detachably attached to a tap 24 by screws 25 or the like.

A ball valve 28 designed to selectively close the path (a) or (b) is attached on the shaft 27 of a switch lever 26. The switch lever 26 is rotationally operable to close one of the paths (a) or (b) by the ball valve 28 so that water supplied from the tap 24 can be led to either path.

A hose 29 is connected to the alkaline water outlet 11 of the electrolytic cell 2. The other end of the hose 29 is connected to a faucet 30 provided at the bottom of the case 1.

Likewise, a hose 31 is connected to the acidic water outlet 12, and the other end of the hose 31 is connected to the top end 32-a of the vertical pipe portion of a turned-T shaped joint pipe 32 connected to the discharge outlet 10 of the electrolytic cell 2. The lower end 32-b of the vertical pipe portion is connected to the discharge hose 33 which extends to the outside of the case 1.

A ball valve 34 is provided at the discharge outlet 10 of the electrolytic cell 2 and adapted to close the discharge outlet 10 under pressure of water supplied into the electrolytic cell 2 during the electrolysis so that an acidic water formed flows through the hose 31 and the joint pipe 32 to the discharge hose 33. After the completion of the electrolysis, i.e. after use, the ball valve 34 moves to open the discharge outlet 10 so that the water in the electrolytic cell 2 is completely drained.

The electrical apparatus 3 which actuates the apparatus of the present invention comprises a transformer 35, a rectifier 36, a fuse 37, a concentration change-over switch 38 and other electrically necessary elements such as a power switch, a pilot lamp, or the like, which are arranged to provide the necessary electrical functions. Numeral 39 designates a plug for connection to a power source.

Having thus described the construction of the apparatus of the present invention, the operation will now be explained. The plug 39 is connected to a power source and the divergent valve 22 is connected to a water tap 24. Then, the switch lever 27 of the divergent valve 22 is rotated to open the path (a) which leads to the apparatus of the present invention. Then the valve of the tap 24 is opened. Next, the power switch is turned on, whereupon the quantitative valve 4 operates to supply a predetermined amount of water to the electrolytic cell 2 and at the same time the anode and cathode plates 16 and 17 commence electrolysis.

Within the electrolytic cell 2, water is supplied from the water inlet 9 at the bottom and the water moves upwards while being electrolyzed. Alkaline water which is formed therein flows through the outlet 11 and the hose 29 and is recovered from the faucet 30. The acidic water flows through the outlet 12 and the hose 31 and is discharged by the discharge hose 33.

The electrolysis operation is continuously carried out with the valve of the water tap 24 maintained open and the power switch held in the on position. Thus, it is possible to obtain alkaline water continuously.

Furthermore, the concentration of the alkaline water may simply be changed by adjusting the concentration change-over switch 38 to a desired value.

Having thus described the invention, it should be understood that the present invention provides an apparatus capable of continuously producing alkaline and acidic waters by simply connecting it to a water tap, without the necessity of using a diaphragm between the anode and cathode plates in an electrolytic cell. Furthermore, the bottom of the electrolytic cell is downwardly inclined towards the discharge outlet so that the water is completely drained after use, and the cell does not have a diaphragm which tends to become infested by bacteria. Thus a very sanitary apparatus is provided.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. An apparatus for producing alkaline water and acidic water which includes a container which houses an electrolytic cell, said electrolytic cell containing a lower chamber provided with a water inlet zone and a water outlet zone, and an upper chamber containing anode plates and cathode plates disposed in a spaced apart predetermined relationship, inlet means for introducing water into the water inlet zone of the lower chamber of said electrolytic cell, said inlet means including valve means, first and second outlet means disposed at the upper end portion of the upper chamber for removing alkaline water and acidic water respectively, therefrom, said first outlet means provided with means for discharge from the apparatus, and said second outlet means provided with means for communicating with the water outlet zone for discharge from the apparatus, and electrical means for providing the necessary electrical power to the apparatus.

2. The apparatus of claim 1, wherein the lower chamber of the electrolytic cell has a bottom which is inclined downwardly from the water inlet zone to the water outlet zone.

3. The apparatus of claim 2 wherein the water outlet zone includes an aperture which is provided with a valve means.

4. The apparatus of claim 3 wherein the valve means is a ball valve.

5. The apparatus of claim 3 wherein the aperture of the water outlet zone is connected by a T joint to the second outlet means.

6. The apparatus of claim 1 wherein the inlet means for introducing water into the water inlet zone includes a quantitative valve means.

7. The apparatus of claim 5 which further includes a divergent valve, a filter cylinder and conduit means which communicate with said quantitative valve means.

8. The apparatus of claim 1 wherein the lower chamber is separated from the upper chamber by a divider plate provided with a plurality of perforations through which water is introduced into the upper chamber.

9. The apparatus of claim 1 wherein the first and second outlet means communicate with inner and outer chambers disposed in the upper end portion of the upper chamber, said inner and outer chambers being separated by divider wall means.

10. The apparatus of claim 9 wherein the anode plates are separated a predetermined distance from the cathode plates by a non-permeable frame member provided with protrusion means, whereby the water passing between the anode plates and cathode plates is electrolyzed and separated into respective chambers by said divider wall means.

11. An apparatus for the instantaneous and continuous electrolyzation of water to produce alkaline water and acidic water which comprises a container which houses an electrolytic cell, said electrolytic cell containing a lower chamber provided with a water inlet zone and a water outlet zone, said lower chamber having a bottom which is inclined downwardly from the water inlet zone to the water outlet zone, and an upper chamber containing anode plates and cathode plates disposed in a spaced apart predetermined relationship, inlet means for introducing water into the water inlet zone of the lower chamber of said electrolytic cell, said inlet means including a quantitative valve means, first and second outlet means disposed at the upper end portion of the upper chamber for removing alkaline water and acidic water respectively, therefrom, said first outlet means provided with means for discharge from the apparatus, and said second outlet means provided with means for communicating with the water outlet zone for discharge from the apparatus, and electrical means for providing the necessary electrical power to the apparatus.

* * * * *